United States Patent …

(12) United States Patent
Ho et al.

(10) Patent No.: US 9,866,329 B2
(45) Date of Patent: Jan. 9, 2018

(54) OPTICAL TRANSMITTER OR TRANSCEIVER INCLUDING TRANSMITTER OPTICAL SUBASSEMBLY (TOSA) MODULES DIRECTLY ALIGNED TO OPTICAL MULTIPLEXER INPUTS

(71) Applicant: Applied Optoelectronics, Inc., Sugar Land, TX (US)

(72) Inventors: I-Lung Ho, Sugar Land, TX (US); YongXuan Liang, Stafford, TX (US); Stella Liang Chen, Richmond, TX (US)

(73) Assignee: Applied Orthoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/176,382

(22) Filed: Jun. 8, 2016

(65) Prior Publication Data

US 2017/0359125 A1 Dec. 14, 2017

(51) Int. Cl.
*H04B 10/40* (2013.01)
*H04B 10/50* (2013.01)
*H04B 10/66* (2013.01)
*H04B 10/572* (2013.01)
*H04J 14/02* (2006.01)

(52) U.S. Cl.
CPC ........... *H04B 10/40* (2013.01); *H04B 10/503* (2013.01); *H04B 10/572* (2013.01); *H04B 10/66* (2013.01); *H04J 14/02* (2013.01)

(58) Field of Classification Search
CPC .... H04B 10/40; H04B 10/503; H04B 10/572; H04B 10/66; H04J 14/02
USPC ......................................................... 398/82
See application file for complete search history.

(56) References Cited

U.S. PATENT DOCUMENTS

| 6,278,813 B1 | 8/2001 | Takada et al. |
| 9,143,261 B2 * | 9/2015 | Takahashi ............... H04B 10/40 |
| 2003/0223709 A1 | 12/2003 | Lake et al. |
| 2006/0013541 A1 * | 1/2006 | Plickert ................ G02B 6/4246 |
| | | 385/89 |

(Continued)

FOREIGN PATENT DOCUMENTS

WO 2013034311 A1 3/2013

OTHER PUBLICATIONS

U.S. Office Action dated Apr. 4, 2017, received in U.S. Appl. No. 15/176,404, 23 pgs.

(Continued)

*Primary Examiner* — Dalzid Singh
(74) *Attorney, Agent, or Firm* — Grossman Tucker Perreault & Pfleger, PLLC

(57) ABSTRACT

A multi-channel optical transmitter or transceiver includes transmitter optical subassembly (TOSA) modules optically coupled to and directly aligned with mux input ports of an optical multiplexer without using optical fibers. The optical multiplexer may include an arrayed waveguide grating (AWG) or a reversed planar lightwave circuit (PLC) splitter and may be located in a multiplexer housing having at least one side wall with input apertures aligned with the mux input ports. The TOSA modules may include a base supporting at least a laser, laser driving circuitry, and a lens for focusing the light output from the laser. Z-rings may be used to facilitate alignment and to mount the TOSA bases to the side wall of the multiplexer housing, for example, by laser welding.

26 Claims, 5 Drawing Sheets

(56) References Cited

U.S. PATENT DOCUMENTS

| | | | |
|---|---|---|---|
| 2006/0022213 A1* | 2/2006 | Posamentier | H01S 5/02212 257/99 |
| 2009/0073582 A1* | 3/2009 | Lee | G02B 7/021 359/819 |
| 2011/0033192 A1 | 2/2011 | Daiber et al. | |
| 2011/0058771 A1* | 3/2011 | Lee | G02B 6/4215 385/33 |
| 2012/0251056 A1 | 10/2012 | Tanaka et al. | |
| 2013/0039662 A1* | 2/2013 | Brooks | G02B 6/12007 398/91 |
| 2013/0121651 A1 | 5/2013 | Takahashi et al. | |
| 2013/0195441 A1 | 8/2013 | Lee et al. | |
| 2013/0287407 A1 | 10/2013 | Pan et al. | |
| 2014/0346323 A1* | 11/2014 | Fujimura | G01J 1/44 250/208.2 |
| 2015/0318952 A1 | 11/2015 | Butrie et al. | |
| 2016/0050019 A1* | 2/2016 | Gothoskar | H04B 10/40 398/135 |
| 2016/0147017 A1 | 5/2016 | Tamura | |
| 2017/0059796 A1* | 3/2017 | Huang | G02B 6/4251 |

OTHER PUBLICATIONS

EP Search Report dated Nov. 7, 2017, received in EP Application Serial No. 17174985.6, 8 pgs.

* cited by examiner

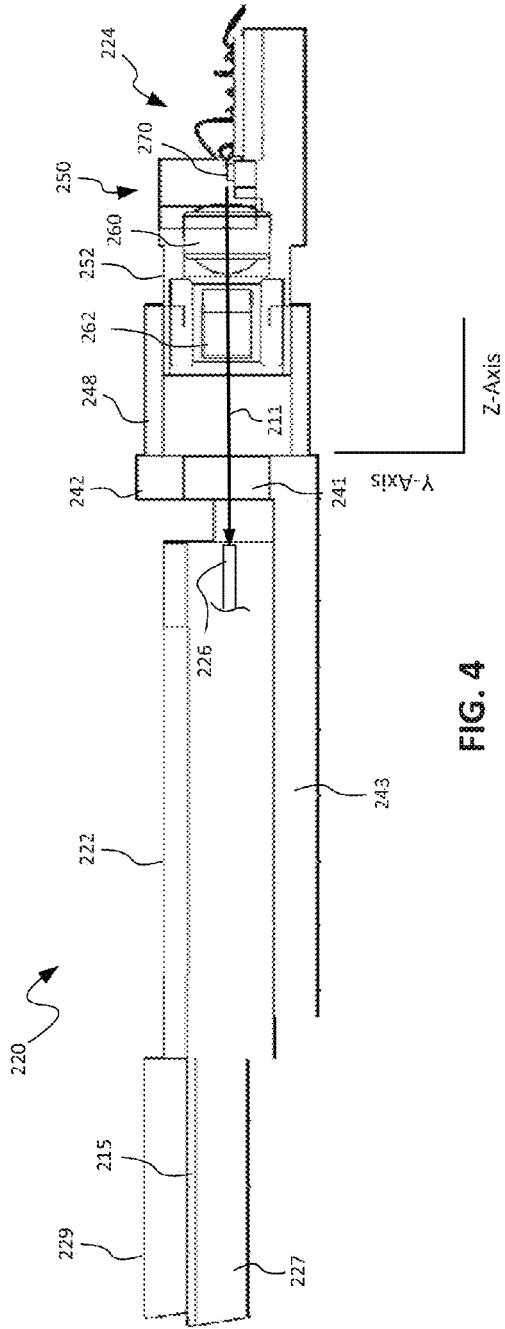
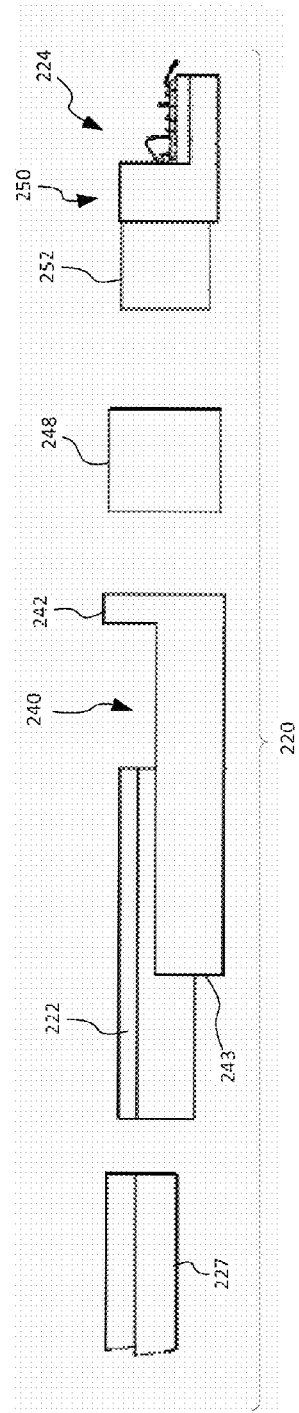

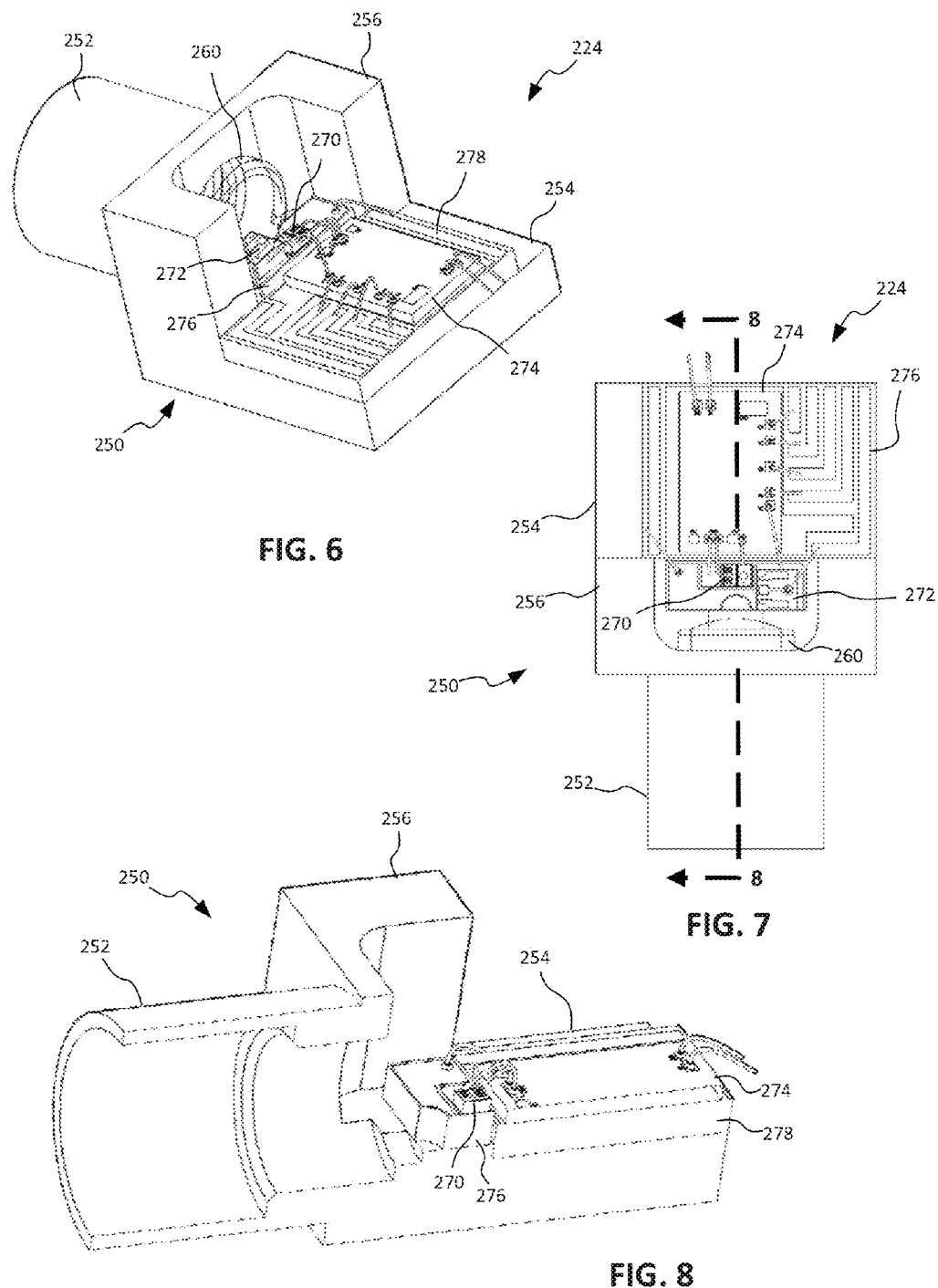

US 9,866,329 B2

OPTICAL TRANSMITTER OR TRANSCEIVER INCLUDING TRANSMITTER OPTICAL SUBASSEMBLY (TOSA) MODULES DIRECTLY ALIGNED TO OPTICAL MULTIPLEXER INPUTS

TECHNICAL FIELD

The present disclosure relates to optical transmitters and transceivers, and more particularly, to an optical transmitter or transceiver including transmitter optical subassembly (TOSA) modules directly aligned to optical multiplexer inputs.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver.

BRIEF DESCRIPTION OF THE DRAWINGS

These and other features and advantages will be better understood by reading the following detailed description, taken together with the drawings wherein:

FIG. 4 is a cross-sectional side view of the multi-channel optical transmitter taking along line 4-4 in FIG. 2.

FIG. 5 is an exploded side view of the multi-channel optical transmitter shown in FIG. 3.

FIG. 6 is a perspective view of an embodiment of a TOSA module for use in the multi-channel optical transmitter shown in FIG. 2.

FIG. 7 is a top view of the TOSA module shown in FIG. 6.

FIG. 8 is a cross sectional view of the TOSA module taken along line 8-8 in FIG. 7 without the optical components.

DETAILED DESCRIPTION

A multi-channel optical transmitter or transceiver, consistent with the present disclosure, includes transmitter optical subassembly (TOSA) modules optically coupled to and directly aligned with mux input ports of an optical multiplexer without using optical fibers. The optical multiplexer may include an arrayed waveguide grating (AWG) or a reversed planar lightwave circuit (PLC) splitter and may be located in a multiplexer housing having at least one side wall with input apertures aligned with the mux input ports. The TOSA modules may include a base supporting at least a laser, laser driving circuitry, and a lens for focusing the light output from the laser. Z-rings may be used to facilitate alignment and to mount the TOSA bases to the side wall of the multiplexer housing, for example, by laser welding.

Directly aligning the TOSA modules with the mux input ports, eliminates the need for using a fiber array to couple the TOSA modules to the optical multiplexer. The fiber array requires additional space within a transmitter or transceiver housing for arrangement of the fibers. The use of optical fibers within the housing also causes both insertion loss and polarization dependent loss (PDL) when the fibers bend. Different arrangements of fibers may result in different PDL and thus the power may be inconsistent. Thus, eliminating the fiber array may reduce the size of the transmitter or transceiver, improve the power consistency, and improve the overall performance of the transmitter or transceiver.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. As used herein, "directly aligned" refers to an alignment between optical components that allows light to pass from one optical component to another optical component without changing the linear path of the light, for example, without using an optical fiber.

Figure 1:
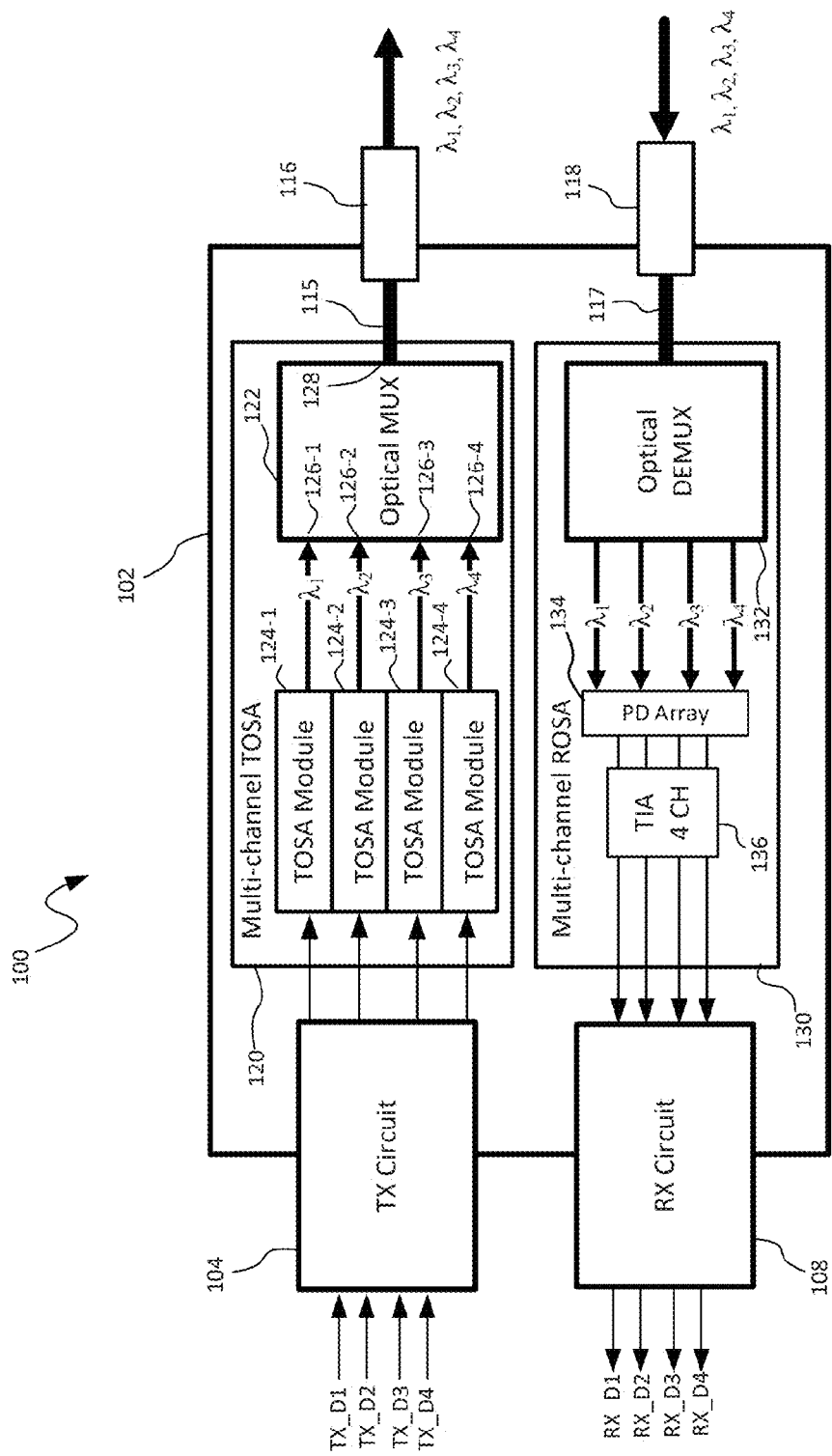
FIG. 1 is a schematic diagram of a multi-channel optical transceiver, consistent with embodiments of the present disclosure.
Figure 2:
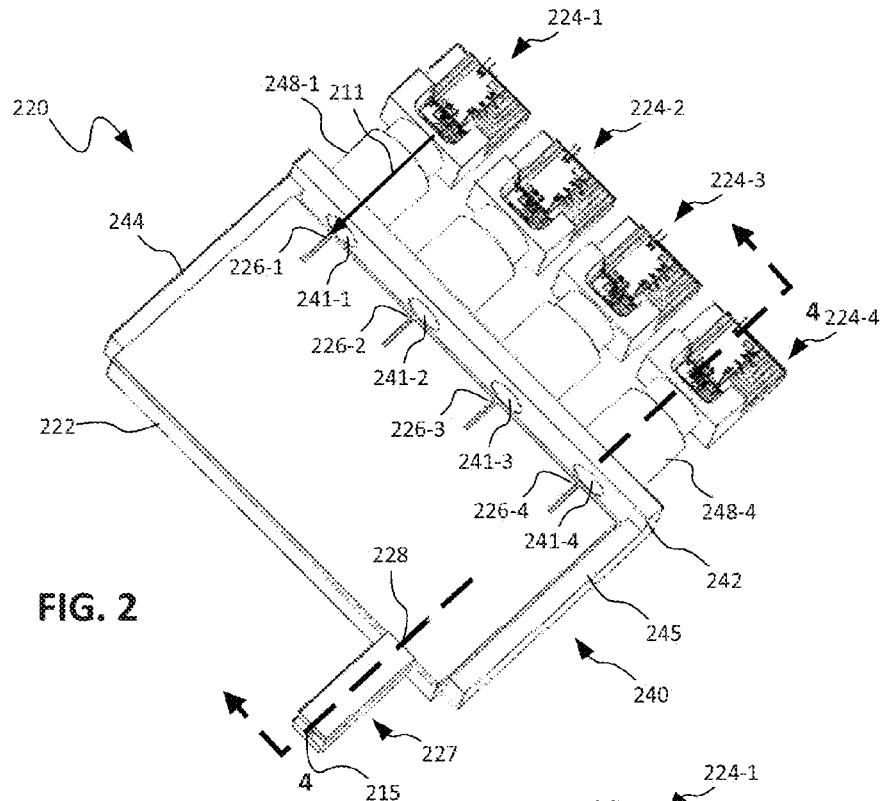
FIG. 2 is a top perspective view of a multi-channel optical transmitter with transmitter optical subassembly (TOSA) modules coupled to and directly aligned with mux inputs of an optical multiplexer, consistent with an embodiment of the present disclosure.
Figure 3:
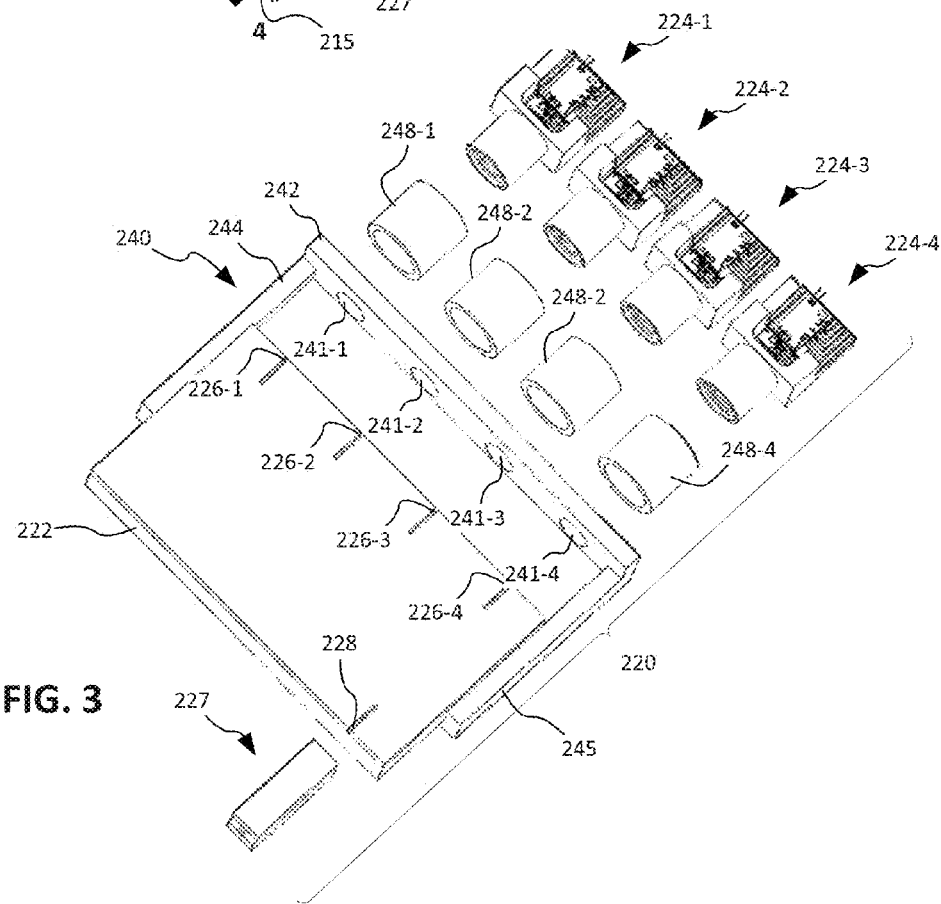
FIG. 3 is an exploded top perspective view of the multi-channel optical transmitter shown in FIG. 2.

Referring to FIG. 1, an optical transceiver 100, consistent with embodiments of the present disclosure, is shown and described. In this embodiment, the optical transceiver 100 transmits and receives four (4) channels using four different channel wavelengths ($\lambda_1, \lambda_2, \lambda_3, \lambda_4$) and may be configured for coarse wavelength division multiplexing (CWDM), although other numbers of channels are possible and within the scope of this disclosure. In one example, the channel wavelengths $\lambda_1, \lambda_2, \lambda_3, \lambda_4$ may be about 1270 nm, 1290 nm, 1310 nm, and 1330 nm, respectively. The optical transceiver 100 may be capable of transmission rates of at least about 25 Gbps per channel. The optical transceiver 100 may also be capable of both short transmission distances of tens of meters, for example, to distances of 2 kilometers or more. The optical transceiver 100 may be used, for example, in internet data center applications or fiber to the home (FTTH) applications.

In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4X Pluggable Transceiver Solution (QSFP28)" published on May 10, 2013. The aspects and embodiments disclosed herein may be used within other transceiver types and is not necessarily limited to QSFP or QFSP+ transceivers.

The optical transceiver 100 includes a multi-channel transmitter optical subassembly (TOSA) 120 for transmitting optical signals on the channel wavelengths (e.g., $\lambda_1$, $\lambda_2$, $\lambda_3$, $\lambda_4$) and a multi-channel receiver optical subassembly (ROSA) 130 for receiving optical signals on the channel wavelengths (e.g., $\lambda_1$, $\lambda_2$, $\lambda_3$, $\lambda_4$). The multi-channel TOSA 120 and the multi-channel ROSA 130 are located in a transceiver housing 102. A transmit connecting circuit 104 and a receive connecting circuit 108 provide electrical connections to the multi-channel TOSA 120 and the multi-channel ROSA 130, respectively, within the housing 102. The transmit connecting circuit 104 is electrically connected to the electronic components (e.g., the lasers, monitor photodiodes, etc.) in the multi-channel TOSA 120 and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry. The transmit connecting circuit 104 and the receive connecting circuit 108 may communicate with external systems via a data bus, such as a 38-pin connector that comports with physical connector QSFP standards and data communication protocols.

In this embodiment, the TOSA 120 includes a plurality of TOSA modules 124-1 to 124-4 optically coupled to an optical multiplexer 122 and directly aligned with mux input ports 122-1 to 122-4 of the optical multiplexer 122, as described in greater detail below. The TOSA modules 124-1 to 124-4 generate optical signals at different respective channel wavelengths ($\lambda_1$, $\lambda_2$, $\lambda_3$, $\lambda_4$) and the optical multiplexer 122 combines or multiplexes those optical signals to provide a multiplexed optical signal on a mux output port 128 of the optical multiplexer 122, which is coupled to an output optical fiber 115. The output optical fiber 115 is coupled to an output optical connector 116, such as an LC connector. The optical multiplexer 122 may include an AWG or a reversed PLC-splitter.

Each of the TOSA modules 124-1 to 124-4 may have a coaxial configuration such that the TOSA module is electrically connected at one end to conductive paths on the transmit connecting circuit 104 and optically coupled at the other end. Each of the TOSA modules 124-1 to 124-4 may include a laser for generating laser light at the assigned channel wavelength and optics for coupling the laser light into the respective mux input ports of the optical multiplexer 122. The lasers in the TOSA modules 124-1 to 124-4 thus convert electrical data signals (TX_D1 to TX_D4) received via the transmit connecting circuit 104 into modulated optical signals coupled into the optical multiplexer 122. The lasers may include, for example, distributed feedback (DFB) lasers with diffraction gratings. Each of the TOSA modules 124-1 to 124-4 may also include a monitor photodiode for monitoring the light emitted by the lasers. Each of the TOSA modules 124-1 to 124-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA 130 includes an optical demultiplexer 132 coupled to a photodetector array 134 including, for example, photodiodes. The optical demultiplexer 132 demultiplexes or separates a multiplexed optical signal received on an input optical fiber 117 to provide received optical signals at different channel wavelengths, which are detected by respective photodetectors in the photodetector array 134. The input optical fiber 117 is coupled to an input optical connector 118, such as an LC connector. The multi-channel ROSA 130 also includes a multi-channel transimpedance amplifier 136 electrically connected to the photodetector array 134. The photodetector array 134 and the transimpedance amplifier 136 detect and convert optical signals received from the optical demultiplexer 132 into electrical data signals (RX_D1 to RX_D4) that are output via the receive connecting circuit 108. Although one example of the multi-channel ROSA 130 is described, the optical transceiver 100 may include other types or embodiments of ROSAs.

Referring to FIGS. 2-5, an embodiment of a multi-channel optical transmitter 220 including TOSA modules 224-1 to 224-4 directly aligned with mux input ports 226-1 to 226-4 of an optical multiplexer 222 is shown and described in greater detail. The multi-channel optical transmitter 220 may be used as the TOSA 120 in the multi-channel transceiver 100 shown in FIG. 1 or may be used separately as a transmitter. Although four (4) TOSA modules 224-1 to 224-4 are shown to support four (4) channels, other numbers of TOSA modules and channels are within the scope of the present disclosure.

In this embodiment, the multi-channel optical transmitter 220 includes a multiplexer housing 240 receiving the optical multiplexer 222 and the TOSA modules 224-1 to 224-4 are mounted to the multiplexer housing 240. The multiplexer housing 240 includes at least one side wall 242 and a plurality of input apertures 241-1 to 241-4 through the side wall 242 and aligned with the mux input ports 226-1 to 226-4 of the optical multiplexer 220. The TOSA modules 224-1 to 224-4 are optically coupled to and directly aligned with the respective mux input ports 226-1 to 226-4 through the respective input apertures 241-1 to 241-4 in the side wall 242. When directly aligned, as shown in FIG. 4, a laser output 211 from a TOSA module 224 passes into the mux input port 226 without using an optical fiber or other optical component to change the path of the laser output 211. The optical multiplexer 222 is designed such that the mux input ports 226-1 to 226-4 are spaced sufficiently to allow the multiple TOSA modules 224-1 to 224-4 to be mounted side-by-side on the side wall 242 and directly aligned with the mux input ports 226-1 to 226-4. The input apertures 241-1 to 241-4 may thus have the same spacing, center-to-center, to align with the mux input ports 226-1 to 226-4. In one example, the mux input ports 226-1 to 226-4 may be spaced about 3.25 mm.

In the illustrated embodiment, Z-rings 248-1 to 248-4 are used to mount the TOSA modules 224-1 to 224-4 to the side wall 242 of the multiplexer housing 240 and to facilitate alignment of the laser output from the TOSA modules 224-1 to 224-4 with the mux input ports 226-1 to 226-4 on the optical multiplexer 222. As shown in FIG. 4 and described in greater detail below, each TOSA module 224 includes a TOSA base 250 having an optical coupling end 252 that is received inside and secured to a respective Z-ring 248. In the illustrated embodiment, the optical coupling end 252 of the TOSA base 250 is cylindrical shaped and is received in a cylindrical aperture in the Z-ring 248, although other shapes are within the scope of the present disclosure. The Z-ring 248 may be made of a metal material such as stainless steel.

Before the Z-ring 248 is secured to the optical coupling end 252 of the TOSA base 250, the TOSA module 224 may be aligned along the Z axis relative to the mux input port 226. Once aligned along the Z-axis, the Z-ring 248 may be secured, in the aligned position, to the optical coupling end 252, for example, by laser welding with a YAG laser or other suitable laser. The TOSA module 224 with the attached Z-ring 248, already aligned in the Z-axis, may then be aligned along the X-Y axes relative to the mux input port 226. Once aligned along the X-Y axes, the Z-ring 248 may be secured to the side wall 241, for example, using laser welding with a YAG laser or other suitable laser. Laser welding allows the TOSA module 224 to be re-aligned or re-hammered later, if necessary, by softening the weld with the laser and adjusting the coupling position to the desired power.

Alignment may be performed, for example, by measuring the power of light coupled into the optical multiplexer 222 and determining a position of the TOSA module 224 relative to the optical multiplexer 22 that provides maximum or relative maximum power. The coupled laser light may be measured, for example, from a mux output port 228 of the optical multiplexer 222 while moving the TOSA module 224 in the Z and/or X-Y directions as described above.

An output optical fiber 215 may be optically coupled to and aligned with the mux output port 228, for example, using a fiber alignment base 227 including a V-shaped groove. A fiber holder 229 may be used to hold the optical fiber 215 in the V-shaped groove in the fiber alignment base 227. The output optical fiber 215 may also be coupled to the mux output port 228 using other techniques.

The multiplexer housing 240 may be made of a metal material, such as stainless steel, which is similar to the material of the Z-ring 248 to facilitate welding. In the example embodiment, the multiplexer housing 240 includes a base 243 and end walls 244, 245 on each end of the side wall 242 (see FIGS. 2 and 3). The end walls 244, 245 may be spaced to receive the optical multiplexer 222 and align the mux input ports 226-1 to 226-1 with the respective input apertures 241 in the side wall 242. The multiplexer housing 240 may be open on an opposite side or at least include a space sufficient to allow the output optical fiber 215 to be directly coupled to the mux output port 228. Other configurations of the multiplexer housing 240 are also within the scope of the present disclosure.

The optical multiplexer 222 may be an AWG including waveguides that filter the optical signals received on the mux input ports 226-1 to 226-4 and combine the optical signals into a multiplexed optical signal. The optical multiplexer 222 may also be a reversed PLC splitter with splitter output ports used as the mux input ports 226-1 to 226-4 and a splitter input port used as the mux output port 228. The reversed PLC splitter includes branched waveguides that combine the optical signals received on the mux input ports into a multiplexed optical signal on the mux output port. A reversed PLC-splitter used as an optical multiplexer is described in greater detail in U.S. patent application Ser. No. 15/176,404 entitled OPTICAL TRANSMITTER OR TRANSCEIVER INCLUDING REVERSED PLANAR LIGHTWAVE CIRCUIT (PLC) SPLITTER FOR OPTICAL MULTIPLEXING, commonly owned and filed concurrently herewith.

FIGS. 6-8 show an embodiment of the TOSA module 224 in greater detail. The TOSA base 250 includes an electrical coupling end 254 opposite the optical coupling end 252 and walls 256 between the optical coupling end 252 and the electrical coupling end 254. In this embodiment, the TOSA module 224 includes a lens 260 and an isolator 262 located in the optical coupling end 252 and a laser diode 270, monitor photodiode 272, and laser driver circuitry 274 supported on the electrical coupling end 254 of the TOSA base 250. The isolator 262 is located inside the optical coupling end 252 and the lens 260 is located in an opening to the optical coupling end 252 such that light output from the laser diode 270 is focused by the lens 260 through the isolator 262 and through the input aperture 241 to the mux input port 226 (see FIG. 4). The laser diode 270 and the monitor photodiode 272 are mounted on a diode submount 276 and the laser driver circuitry 274 is mounted on a laser driver submount 278 including conductive paths for providing electrical connections.

Figure 9:
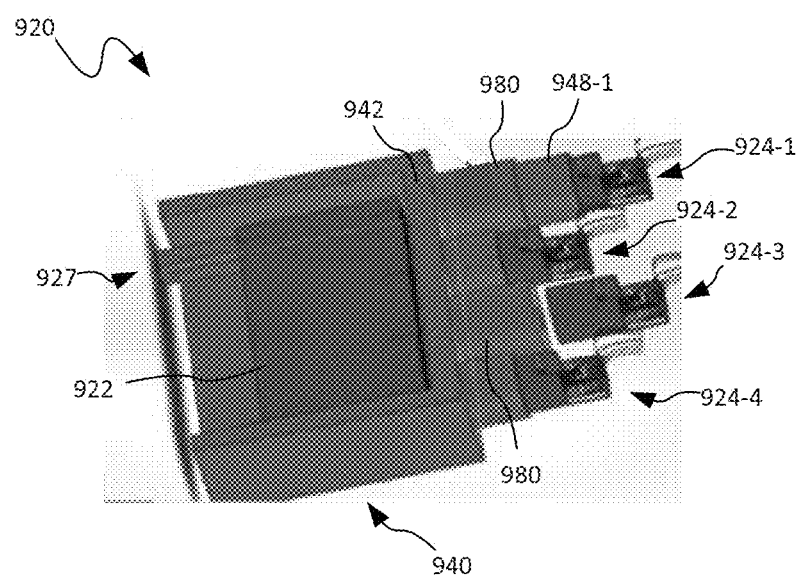
FIG. 9 is a top perspective view of another embodiment of a multi-channel transmitter with TOSA modules coupled to and directly aligned with mux inputs of an optical multiplexer.

Referring to FIG. 9, another embodiment of a multi-channel optical transmitter 920 includes one or more spacers 980 mounted to a multiplexer housing 940 to space one or more TOSA modules 924-1 to 924-4 at different distances from the multiplexer housing 940. The TOSA modules 924-1 to 924-4 may otherwise be aligned as discussed above. Each spacer 980 may be mounted to a side wall 942 of the multiplexer housing 940, for example, using epoxy or welding. The TOSA module 924-1 may then be mounted to the spacer 980, for example, using a Z-ring 948-1 and laser welding as described above. The spacers 980 may be made of stainless steel.

In the illustrated embodiment, the spacers 980 are used to space the TOSA module 924-1 and the third TOSA module 924-3 further from a side wall 942 of the housing 940. Having some of the TOSA modules 924-1 to 924-4 at different distances avoids interference of adjacent TOSA modules during laser welding. For example, the first and third TOSA modules 924-1, 924-3 may be welded first.

Accordingly, a multi-channel transmitter or transceiver, consistent with embodiments described herein, includes TOSA modules optically coupled to and directly aligned with mux input ports of an optical multiplexer to eliminate the fiber array used to couple TOSA modules.

Consistent with one embodiment, a multi-channel optical transceiver includes a transceiver housing, a plurality of transmitter optical subassembly (TOSA) modules for transmitting a plurality of optical signals at different respective channel wavelengths, and an optical multiplexer for multiplexing the plurality of optical signals into a multiplexed optical signal including the different channel wavelengths. The optical multiplexer includes a plurality of mux input ports optically coupled with and directly aligned to the respective TOSA modules, without using optical fibers, for receiving the respective optical signals and a mux output port for outputting the multiplexed optical signal. The multi-channel optical transceiver also includes a multi-channel receiver optical subassembly (ROSA) for receiving a multiplexed optical signal including multiple channel wavelengths, separating the channel wavelengths, and detecting optical signals at each of the channel wavelengths.

Consistent with another embodiment, a multi-channel optical transmitter includes a multiplexer housing including at least one side wall with input apertures and an optical multiplexer located in the housing for multiplexing the plurality of optical signals into a multiplexed optical signal including the different channel wavelengths. The optical multiplexer includes a plurality of mux input ports and a mux output port for outputting a multiplexed optical signal, the mux input ports being aligned with the input apertures, respectively. The multi-channel optical transmitter also includes a plurality of transmitter optical subassembly (TOSA) modules for transmitting a plurality of optical signals at different respective channel wavelengths. The TOSA modules are mounted to the housing and coupled to and directly aligned with the mux input ports of the optical multiplexer through the input apertures, respectively, without using optical fibers.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A multi-channel optical transceiver comprising:
    a transceiver housing;
    a plurality of transmitter optical subassembly (TOSA) modules for transmitting a plurality of optical signals at different respective channel wavelengths;
    an optical multiplexer for multiplexing the plurality of optical signals into a multiplexed optical signal including the different channel wavelengths, the optical multiplexer including a plurality of mux input ports optically coupled with and directly aligned to the respective TOSA modules, without using optical fibers, for receiving the respective optical signals and a mux output port for outputting the multiplexed optical signal;
    a multi-channel receiver optical subassembly (ROSA) for receiving a multiplexed optical signal including multiple channel wavelengths, separating the channel wavelengths, and detecting optical signals at each of the channel wavelengths; and
    a multiplexer housing receiving the optical multiplexer, the multiplexer housing including at least one side wall with input apertures aligned with the mux input ports, wherein the TOSA modules are mounted to the sidewall.

2. The multi-channel optical transceiver of claim 1, further comprising at least one spacer coupled between at least one of the mux input ports and at least one of the TOSA modules.

3. The multi-channel optical transceiver of claim 1, further comprising Z-rings mounting each of the TOSA modules to the side wall.

4. The multi-channel optical transceiver of claim 3, wherein the TOSA modules are welded to the Z-rings, and wherein the Z-rings are welded to the multiplexer housing.

5. The multi-channel optical transceiver of claim 3, further comprising at least one spacer coupled between the side wall and at least one of the Z-rings.

6. The multi-channel optical transceiver of claim 1, wherein each of the TOSA modules include a TOSA base, a laser diode supported on the base, laser driving circuitry supported on the base, and a lens aligned with the laser diode for optically coupling laser light.

7. The multi-channel optical transceiver of claim 6, wherein the TOSA base of each of the TOSA modules includes an optical coupling end optically coupled to the mux input and an electrical coupling end for providing electrical connections, wherein the optical coupling end defines an aperture aligned with the lens and the laser diode, and wherein the electrical coupling end supports the laser driving circuitry.

8. The multi-channel optical transceiver of claim 7, further including an isolator located in the aperture of the optical coupling end of the TOSA base of each of the TOSA modules.

9. The multi-channel optical transceiver of claim 7, wherein the optical coupling end is cylindrically shaped and received in a cylindrical aperture of the Z-ring.

10. The multi-channel optical transceiver of claim 1, wherein the optical multiplexer is an arrayed waveguide grating (AWG).

11. The multi-channel optical transceiver of claim 1, wherein the optical multiplexer is a reversed planar lightwave circuit (PLC) splitter including a plurality of splitter output ports used as the mux input ports, a splitter input port used as the mux output port and branched waveguides configured to combine the optical signals into the multiplexed optical signal.

12. The multi-channel optical transceiver of claim 11, wherein the reversed PLC splitter is a 1:4 splitter providing 4 mux input ports and 1 mux output port.

13. The multi-channel optical transceiver of claim 1, wherein the transceiver is a Small Form-factor Pluggable (SFP) transceiver module.

14. The multi-channel optical transceiver of claim 13, wherein the TOSA modules include four (4) TOSA modules each configured to transmit an optical signal at a transmission rate of at least about 25 Gbps.

15. The multi-channel optical transceiver of claim 1, wherein the TOSA modules include four (4) TOSA modules each configured to transmit an optical signal at a transmission rate of at least about 25 Gbps.

16. A multi-channel optical transmitter comprising:
    a multiplexer housing including at least one side wall with input apertures;
    an optical multiplexer located in the multiplexer housing for multiplexing a plurality of optical signals into a multiplexed optical signal including different channel wavelengths, the optical multiplexer including a plurality of mux input ports and a mux output port for outputting a multiplexed optical signal, the mux input ports being aligned with the input apertures, respectively;
    a plurality of transmitter optical subassembly (TOSA) modules for transmitting a plurality of optical signals at different respective channel wavelengths, the TOSA modules mounted to the multiplexer housing and coupled to and directly aligned with the mux input ports of the optical multiplexer through the input apertures, respectively, without using optical fibers; and
    at least one spacer coupled between at least one of the mux input ports and at least one of the TOSA modules.

17. The multi-channel optical transmitter of claim 16, further comprising Z-rings mounting each of the TOSA modules to the side wall.

18. The multi-channel optical transmitter of claim 17, wherein the TOSA modules are welded to the Z-rings, and wherein the Z-rings are welded to the side wall of the multiplexer housing.

19. The multi-channel optical transmitter of claim 18, wherein the at least one spacer is coupled between the side wall and at least one of the Z-rings.

20. The multi-channel optical transmitter of claim 16, wherein each of the TOSA modules include a TOSA base, a laser diode supported on the base, laser driving circuitry supported on the base, and a lens supported on the base and aligned with the laser diode for optically coupling laser light.

21. The multi-channel optical transmitter of claim 20, wherein the TOSA base of each of the TOSA modules includes an optical coupling end optically coupled to the mux input and an electrical coupling end for providing electrical connections, wherein the optical coupling end defines an aperture aligned with the lens and the laser diode, and wherein the electrical coupling end supports the laser driving circuitry.

22. The multi-channel optical transmitter of claim 21, further including an isolator located in the aperture of the optical coupling end of the TOSA base of each of the TOSA modules.

23. The multi-channel optical transmitter of claim 21, wherein the optical coupling end is cylindrically shaped and received in a cylindrical aperture of the Z-ring.

24. The multi-channel optical transmitter of claim 16, wherein the optical multiplexer is an arrayed waveguide grating (AWG).

25. The multi-channel optical transmitter of claim 16, wherein the optical multiplexer is a reversed planar lightwave circuit (PLC) splitter including a plurality of splitter output ports used as the mux input ports, a splitter input port used as the mux output port and branched waveguides configured to combine the optical signals into the multiplexed optical signal.

26. The multi-channel optical transmitter of claim 16, wherein the TOSA modules include four (4) TOSA modules each configured to transmit an optical signal at a transmission rate of at least about 25 Gbps.

* * * * *